United States Patent
Chen et al.

(10) Patent No.: US 10,937,131 B2
(45) Date of Patent: Mar. 2, 2021

(54) IMAGE DEBLURRING ALGORITHM BASED ON SPARSE POSITIVE SOURCE SEPARATION MODEL

(71) Applicant: SUN YAT-SEN UNIVERSITY, Guangdong (CN)

(72) Inventors: Chongyu Chen, Guangdong (CN); Liang Lin, Guangdong (CN)

(73) Assignee: SUN YAT-SEN UNIVERSITY, Guangzhou (CN)

( * ) Notice: Subject to any disclaimer, the term of this patent is extended or adjusted under 35 U.S.C. 154(b) by 88 days.

(21) Appl. No.: 16/341,841

(22) PCT Filed: Jun. 15, 2017

(86) PCT No.: PCT/CN2017/088413
§ 371 (c)(1),
(2) Date: Apr. 12, 2019

(87) PCT Pub. No.: WO2018/227465
PCT Pub. Date: Dec. 20, 2018

(65) Prior Publication Data
US 2019/0318459 A1   Oct. 17, 2019

(51) Int. Cl.
*G06T 5/00* (2006.01)
*G02B 21/36* (2006.01)
(52) U.S. Cl.
CPC ........... *G06T 5/003* (2013.01); *G02B 21/365* (2013.01); *G06T 2207/10056* (2013.01); *G06T 2207/20021* (2013.01)

(58) Field of Classification Search
CPC ........... G06T 5/003; G06T 2207/10056; G06T 2207/20021; G06T 5/20; G02B 21/365; G02B 21/008
(Continued)

(56) References Cited

U.S. PATENT DOCUMENTS

2009/0012369 A1* 1/2009 Robinson ............. A61B 1/0607
600/182
2013/0303884 A1* 11/2013 Kuntz .................... A61B 6/503
600/417
(Continued)

FOREIGN PATENT DOCUMENTS

CN          105954750 A     9/2016

OTHER PUBLICATIONS

International search report of PCT Patent Application No. PCT/CN2017/088413 dated Mar. 19, 2018.
(Continued)

*Primary Examiner* — Juan A Torres

(57) ABSTRACT

Provided is an image deblurring algorithm based on a sparse positive source separation model. The image deblurring algorithm is used for performing processing on a blurry image collected by an optical microscopic imaging system and generated due to diffraction effect and optical deviation; under a condition of single light sensitive imaging and of not increasing an external imaging device, a spatial resolution of the optical microscopic system may be improved to a nanoscale. In the disclosure, a blurring process of microscopic imaging is expressed as a linear combination of a Point Spread Function of the imaging system; by embedding the process into a positive separation optimized frame, adding a sparsity constraint and solving to remove blurring, the high-resolution microscopic imaging is implemented.

4 Claims, 2 Drawing Sheets

Blurry image    Image block    RID    The disclosure   Actual value

(58) Field of Classification Search
USPC ........................................................ 382/255
See application file for complete search history.

(56) References Cited

U.S. PATENT DOCUMENTS

2013/0343625 A1* 12/2013 Samsonov ......... G01R 33/5611
382/131
2015/0221103 A1* 8/2015 Knopp .................. G06T 11/005
324/301
2015/0287223 A1* 10/2015 Bresler ................ G06T 11/006
382/131

OTHER PUBLICATIONS

Veniamin I. Morgenshtern et al., Super-Resolution of Positive Sources: the Discrete Setup, Siam Journal on Imaging Sciences, 9(1), Dec. 31, 2016 , pp. 412-444.
Hui Ji et al., Robust image de-blurring with inaccurate blur kernels, IEEE Trans. Image Processing, 2012.

* cited by examiner

Blurry image   Image block   RID   The disclosure   Actual value

IMAGE DEBLURRING ALGORITHM BASED ON SPARSE POSITIVE SOURCE SEPARATION MODEL

TECHNICAL FIELD

The disclosure relates to the field of image processing algorithms, and more particularly, to an image deblurring algorithm based on a sparse positive source separation model.

BACKGROUND

An optical microscopy may implement wide field-of-view observation on a sample in single exposure and is an ideal observation tool for scientific researches in nano materials, medicine, biology and the like. Compared with an electron microscope that needs a vacuum working environment, an optical microscope has an ultra-low damage to the sample. However, due to diffraction effect, even an ideal optical microscope still cannot visually distinguish a detail less than a diffraction limit (about half of a wavelength of a light source and pushed forward by Ernst Karl Abbe). The diffraction limit is as always a key factor with which an optical microscopic system cannot directly observe a structure at a nanoscale.

The research of a super-resolution optical microscopy aims to implement a spatial resolution beyond the diffraction limit. In recent years, the representative techniques include a Single-Molecule Localization Microscopy (SMLM), a Structural Illumination Microscopy (SIM), a Stimulated Emission Depletion (STED), and a Scanning Near-field Optical Microscope (SNOM). Working principles of the SNOM and the STED are very elegant physically. However, both work generally under a point-to-point laser or sample scanning mode, so it is very time-consuming in large-area imaging and there is very high photobleaching. A super-lens microscope (X. Zhang, Nature Communications, 2011) analyzes a detail less than the wavelength by virtue of an evanescent wave and there is a need to place a specially designed lens at a near field, so the application scene is limited. The SSIM generates high-speed on-off structural light via a complex optical device and may implement the high-resolution imaging by collecting and fusing information of multiple pieces of images, so the cost is relatively high and the SSIM is not beneficial to real-time imaging. The representative SMLM techniques include a Photoactivated Localization Microscopy (PALM which won a Nobel prize in chemistry in 2014) and a Stochastic Optical Reconstruction Microscopy (STORM which was pushed forward by Zhuangxiaowei Research Group of Harvard University), and the essence still is a wide-field fluorescence microscopy based on a diffraction limited imaging system. For these methods, to obtain a piece of super-resolution microscopic image, it is required to employ a specifically designed fluorescent dye, collect thousands of pieces of the microscopic images and process then carefully. During the process when multiple pieces of images are collected, laser irradiation needs to be performed on the sample. More exposure generally brings about a higher imaging resolution. However, the time of an imaging process and the damage to the sample are also increased. Although a faster version about the SMLM techniques has been provided in recent years, the number in need of being exposed is still very large and the equipment cost always stays at a high level.

In the past ten years, people also were devoted to researching a super-resolution microscopy based on a computing method all the time. The technique may improve the resolution of an image without additional equipment and only a to-be-blurred microscopic image and a Point Spread Function (PSF) of an optical system are needed to take as an input. Such settings make the super-resolution microscopic imaging under single exposure possible. A great number of mathematical models are pushed forward by people to describe an imaging process, including a classical convolution model and a newly proposed positive source separation model. From the perspective of image processing, the PSF of the optical system is generally considered as a given blurring kernel, and the problem of super-resolution imaging is solved via image deblurring. A better natural image deblurring method such as a Robust Image Deconvolution (RID) method released on IEEE Trans. Image Processing by H. Ji et. al. in 2012 even can get relatively good deblurring effect when the blurring kernel is less accurate. From the perspective of signal separation, the PSF is considered as a known signal source and the blurry image may be viewed as a weighted stack of the PSF at different positions. In this sense, the image deblurring problem may be solved via a non-blind source separation method. The latest development of the positive source separation (for example, a Positive Source Super-Resolution (PSSR) method pushed forward by V. I. Morgenshtern and E. Candès et. al. on SIAM J. Imaging Science in 2016) has shown the huge potential to improve the imaging resolution via positive source signal separation under the frame of the SMLM. However, due to various inconformities (such as optical aberration, background scattering and non-gaussian noise) between an actual imaging system and an ideal mathematical model as well as content differences between the natural image and the microscopic image, the above-mentioned super-resolution computing method applied to a real optical microscope still has various problems and the improvements in the imaging resolution are extremely limited.

SUMMARY OF THE INVENTION

The disclosure provides an image deblurring algorithm based on a sparse positive source separation model. The algorithm may implement optical microscopic imaging at a resolution beyond a diffraction limit.

To this end, the technical solutions of the disclosure are as follows.

An image deblurring algorithm based on a sparse positive source separation model includes the following steps:

S1: calibration is performed on an optical system;

S2: sparsification is performed on an image content; and

S3: an imaging matrix A is established and a sparse positive source separation optimized model is solved.

Further, in the step S2, when multiple pieces of continuous microscopic images are available, the main purpose of the sparsification on the image content is to remove background interference, an interested sparse structure is viewed as a foreground, the background interference is viewed as a background, and the sparsification is performed on the images using sparse low-rank matrix decomposition. When only one piece of blurry microscopic image is available, the main purpose of the sparsification on the image content is to remove a direct-current component in the image, including a spontaneous duration signal from an imaging device during an exposure process, or a smooth image content obtained because the background reflects light/emits the light, and the sparsification is performed on the image using a direct-current component elimination method.

Further, the specific process of the step S1 is as follows:

for a microscopic system with an amplification factor being a, a pixel size being b and a diffraction limit being d, if a point light source with a physical size not greater than b/a is present in an observation range and no other point light sources are present within a range at a distance being d, a light spot generated by the point light source in an imaging plane of the microscopic system is considered as an effective observation of a PSF of the system; three times or more of effective observations of the PSF are collected and are averaged, and then a $w_1*w_2$ image block where the light spot is located after the averaging is taken as an estimation value of the PSF of the optical system, wherein both the $w_1$ and the $w_2$ are an integral value slightly greater than d/b; and when a point light source with a suitable physical size is not present in the observation range, an image that is scaled and clipped properly using an existing PSF is taken as the estimation value of the PSF to establish and solve the sparse positive source separation optimized model.

Further, a process of establishing the imaging matrix A in the step S3 is as follows:

S31: a PSF of one optical system is placed at an $i^{th}$ pixel of an H*W spatial image;

S32: pixels of the spatial image with the PSF are rearranged into HW*1 column vectors; and S33: normalization is performed on the column vectors so that a Euclidean norm is 1.

The sparse positive source separation optimized model solved in the step S3 is as follows:

$$\min_x \|y - Ax\|_1 + \lambda\|x\|_1 \text{ s.t. } x \geq 0$$

Through solving the above model, HW*1 column vectors x corresponding to a clear image may be obtained, wherein the y is column vectors of HW*1 rearranged by the pixels of the blurry image, the x is the HW*1 column vectors corresponding to the clear image, the $\lambda$ is an equilibrium parameter, and the value of the $\lambda$ should be adjusted adaptively according to a noise level and an energy level of the y.

Further, if a to-be-processed image has a large resolution, the image is divided into a plurality of overlapped image blocks for processing. To divide the image blocks, two principles need to be met: 1) the overlapped length on a height direction is not smaller than $w_1$, and the overlapped length on a width direction is not smaller than $w_2$; and 2) the image blocks should be large enough in size so that the image content meets a sparse hypothesis of the sparse positive source separation optimized model.

Compared with the prior art, the technical solutions of the disclosure achieve the following beneficial effects.

According to the algorithm of the disclosure, a deblurring problem of a microscopic image having a sparse structure is modeled into a separation problem of a sparse positive signal using a non-negative linear superposition hypothesis in a microscopic imaging-blurring process; by accurately modeling the imaging process, a convex optimization problem with a nonnegative constrain is obtained; and by solving the optimization problem, a clear high-resolution image can be obtained. The solving process of the optimization process is independent of the diffraction limit as long as the hypothesis of the imaging model is met, and the above-mentioned method can reach a pixel-level image resolution. In cooperation with appropriate amplification factor and pixel size, a microscopic image with a detail analysis resolution beyond the diffraction limit can be obtained. A per-pixel PSF super-position form is used in the microscopic imaging process, so the algorithm is more accurate compared with the traditional global convolution; the image deblurring problem is solved using the sparse positive source separation optimized model, so the pixel-level imaging resolution may be obtained; in combination with an appropriate device, nanoscale optical microscopic imaging can be implemented; and meanwhile, a preprocessing technique oriented to the imaging process is adopted to obtain an image having a sparse non-negative characteristic, so that an input image is more suitable for the proposed optimized model, being beneficial to solving the optimization problem more accurately.

DETAILED DESCRIPTION OF THE EMBODIMENTS

The accompanying drawings are merely for exemplary illustration and cannot be understood as limits to the disclosure.

In order to better illustrate the embodiments, some parts in the accompanying drawings will be neglected, amplified or shrunk and do not represent the size of an actual product.

To a person skilled in the art, it may be understood that some known structures and descriptions in the accompanying drawings may be neglected.

The technical solutions of the disclosure will be further described below with reference to the accompanying drawings and the embodiments.

Embodiment 1

Figure 1:
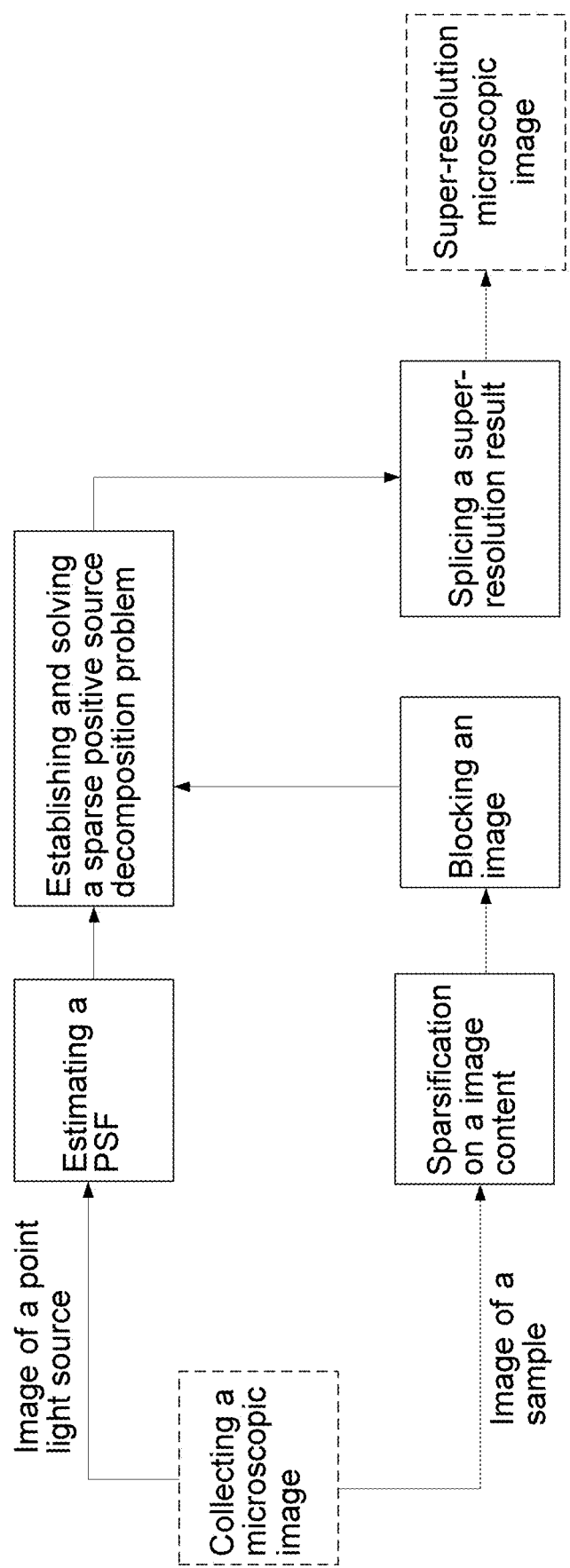
FIG. 1 is a flowchart of the disclosure.

As shown in FIG. 1, an image deblurring algorithm based on a sparse positive source separation model includes the following steps.

S1: calibration is performed on an optical system.

S2: sparsification is performed on an image content.

S3: an imaging matrix A is established and a sparse positive source separation optimized model is solved.

In the step S2, when multiple pieces of continuous microscopic images are available, the main purpose of the sparsification on the image content is to remove background interference, an interested sparse structure is viewed as a foreground, the background interference is viewed as a background, and the sparsification is performed on the images using sparse low-rank matrix decomposition. When only one piece of blurry microscopic image is available, the main purpose of the sparsification on the image content is to remove a direct-current component in the image, including a spontaneous duration signal from an imaging device during an exposure process, or a smooth image content obtained because the background reflects light/emits the light, and the sparsification is performed on the image using a direct-current component elimination method.

The specific process of the step S1 is as follows.

For a microscopic system with an amplification factor being a, a pixel size being b and a diffraction limit being d, if a point light source with a physical size not greater than b/a is present in an observation range and no other point light sources are present within a range at a distance being d, a light spot generated by the point light source in an imaging plane of the microscopic system is considered as an effective observation of a PSF of the system; three times or more of effective observations of the PSF are collected and are averaged, and then a $w_1*w_2$ image block where the light spot is located after the averaging is taken as an estimation value of the PSF of the optical system, wherein both the $w_1$ and the $w_2$ are an integral value slightly greater than d/b; and when a point light source with a suitable physical size is not present in the observation range, an image that is scaled and clipped properly using an existing PSF is taken as the estimation value of the PSF to establish and solve the sparse positive source separation optimized model.

A process of establishing the imaging matrix A in the step S3 is as follows.

S31: a PSF of one optical system is placed at an $i^{th}$ pixel of an H*W spatial image.

S32: pixels of the spatial image with the PSF are rearranged into HW*1 column vectors.

S33: normalization is performed on the column vectors so that a Euclidean norm is 1.

The sparse positive source separation optimized model solved in the step S3 is as follows:

$$\min_{x} \|y - Ax\|_1 + \lambda \|x\|_1 \text{ s.t. } x \geq 0$$

Through solving the above model, HW*1 column vectors x corresponding to a clear image may be obtained, wherein the y is column vectors of HW*1 rearranged by the pixels of the blurry image, the x is the HW*1 column vectors corresponding to the clear image, the λ is an equilibrium parameter, and the value of the λ should be adjusted adaptively according to a noise level and an energy level of the y.

If a to-be-processed image has a large resolution, the image is divided into a plurality of overlapped image blocks for processing. To divide the image blocks, two principles need to be met: 1) the overlapped length on a height direction is not smaller than $w_1$, and the overlapped length on a width direction is not smaller than $w_2$; and 2) the image blocks should be large enough in size so that the image content meets a sparse hypothesis of the sparse positive source separation optimized model.

By taking an application in an optical microscope as an example, a comparison with test results of RID and PSSR methods on a simulation data set is as follows.

1) For a microscopic system with an amplification factor being a, a pixel size being b and a diffraction limit being d, at least three pieces of blurry images, at a physical size not greater than b/a, of a point light source are collected, and it is required that no other point light sources are present within a range at a distance being din an observation range.

2) The collected images of the point light source are averaged in a per-pixel manner, the size of an obtained averaged image is adjusted and clipped according to a relationship among a light emitting wavelength, the b and the d, and a pixel value smaller than 0 is set into 0; and thus a PSF K of a system at the size $w_1*w_2$ is obtained.

3) Common microscopic imaging is performed on an observed image using a system same as in the step 1 to obtain n pieces of microscopic images $I_1, I_2, \ldots, I_n$ at an H*W resolution (the n may be 1).

4) Image content sparsification is performed on a microscopic image sequence $I_1, I_2, \ldots, I_n$ and accumulation is performed to obtain a piece of blurry image Y.

5) It is assumed that non-overlapped areas are $d_1$ and $d_2$ and overlapped areas are $I_1$ and $I_2$, and the image Y is divided into a plurality of $(d_1+2\ I_1)*(d_2+2\ I_2)$ image blocks.

6) It is assumed that $h_1=d_1+2\ I_1$ and $h_2=d_2+2\ I_2$, an imaging matrix A at $h_1\ h_2 h_1\ h_2$ is constructed based on a PSF K and image deblurring is performed on all image blocks in the step 5 using the proposed sparse positive source separation optimized model for solving:

$$\min_{x} \|y - Ax\|_1 + \lambda \|x\|_1 \text{ s.t. } x \geq 0$$

where the y is column vectors of $h_1\ h_2*1$ rearranged by pixels of the blurry image, the x is $h_1\ h_2*1$ column vectors corresponding to a clear image block, the λ is an equilibrium parameter adjusted adaptively according to a noise level and an energy level of the y and according to a suggestion, $\lambda=\beta\|y\|$, $\beta=10^{-3}$.

7) A result diagram at the H*W resolution is constructed; for each of the image blocks, the solved x is restored into an $h_1*h_2$ image, and then a middle $d_1*d_2$ portion is taken out to place at a corresponding position of the result diagram; and when all solved results are placed completely, a piece of clear microscopic image at the H*W resolution is obtained.

Figure 2:
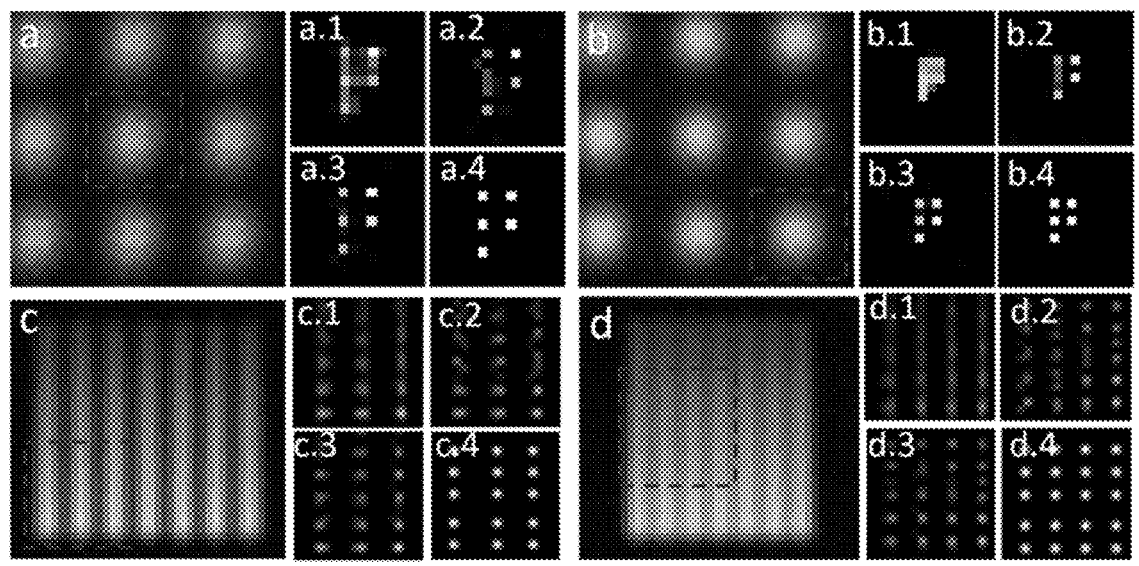
FIG. 2 is a test result diagram of an algorithm of the disclosure and RID and PSSR methods on a simulation data set.

As shown in FIG. 2, there are test results of an algorithm of the disclosure and RID and PSSR methods on a simulation data set. Wherein, a rectangle represents a position of an enlarged image block. The a and the b are blurry images generated by self simulation, distance between adjacent point light sources is two pixels and one pixel, and the c and the d are results on a reference data set "Snow". In each group of results, the "0.1", the "0.2" and the "0.3" respectively are results obtained by the RID, the PSSR and the algorithm of the disclosure, and the "0.4" is an actual value. It may be seen that the blurry images of the point light source at a relatively close distance cannot be well distinguished by the RID and the PSSR. However, the proposed method has a very good super-resolution analysis effect to a dotted structure.

Figure 3:
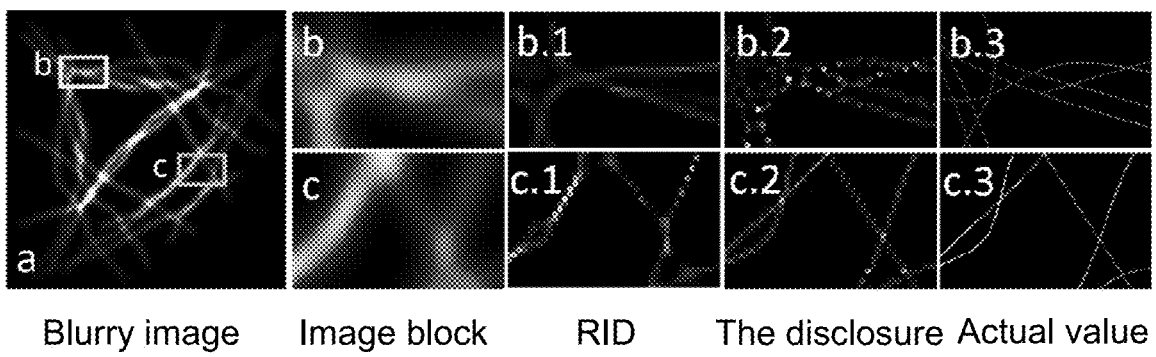
FIG. 3 is a result diagram of a simulation test of an algorithm of the disclosure and an RID method on a reference data set Tubulins-1.

As shown in FIG. 3, there are simulation test results of an algorithm of the disclosure and an RID method on a reference data set Tubulins-l. The a is a blurry image generated based on the data set Tubulins-l, and the b and the c are enlarged image blocks and are respectively corresponding to image blocks in yellow and green rectangular frames in the a. In each group of results, the "0.1" is a processing result of the RID, the "0.2" is a processing result of the disclosure and the "0.3" is an actual value. It may be seen that linear structures at a relatively close distance cannot be well distinguished by the RID. However, the proposed method has a very good super-resolution analysis.

The same or similar numerals are corresponding to the same or similar components.

Terms for describing a positional relationship in the accompanying drawings are merely for exemplary illustration and cannot be understood as limits to the disclosure.

Apparently, the above embodiments of the disclosure are only examples for clearly describing the disclosure, rather than limits to the embodiments of the disclosure. Those of ordinary skill in the art further may make other changes or alternations in different forms based upon the above description. All embodiments are unnecessarily listed herein one by one. Any modification, equivalent replacement, improvement and the like made within the spirit and principle of the disclosure all should be included in a protection scope of the claims of the disclosure.

The invention claimed is:

1. An image deblurring method based on a sparse positive source separation model, comprising:
   S1: performing calibration on an optical system;
   S2: performing sparsification on an image content; and
   S3: establishing an imaging matrix A and solving a sparse positive source separation optimized model;
   wherein in the step S2, when multiple pieces of continuous microscopic images are available, the main purpose of the sparsification on the image content is to remove background interference, an interested sparse structure is viewed as a foreground, the background interference is viewed as a background, and the sparsification is performed on the images using sparse low-rank matrix decomposition; and when only one piece of blurry microscopic image is available, the main purpose of the sparsification on the image content is to remove a direct-current component in the image, comprising a spontaneous duration signal from an imaging device during an exposure process, or a smooth image content obtained because the background reflects light/emits the light, and the sparsification is performed on the image using a direct-current component elimination method.

2. The image deblurring method based on the sparse positive source separation model according to claim 1, wherein the specific process of the step S1 is as follows:
   for a microscopic system with an amplification factor being a, a pixel size being b and a diffraction limit being d, if a point light source with a physical size not greater than b/a is present in an observation range and no other point light sources are present within a range at a distance being d, a light spot generated by the point light source in an imaging plane of the microscopic system is considered as an effective observation of a PSF (Point Spread Function) of the system; three times or more of effective observations of the PSF are collected and are averaged, and then a $w_1 * w_2$ image block where the light spot is located after the averaging is taken as an estimation value of the PSF of the optical system, wherein both the $w_1$ and the $w_2$ are an integral value slightly greater than d/b; and when a point light source with a suitable physical size is not present in the observation range, an image that is scaled and clipped properly using an existing PSF is taken as the estimation value of the PSF to establish and solve the sparse positive source separation optimized model.

3. The image deblurring method based on the sparse positive source separation model according to claim 2, wherein a process of establishing the imaging matrix in the step S3 is as follows:
   S31: placing a PSF of one optical system at an $i^{th}$ pixel of an H*W spatial image;
   S32: rearranging pixels of the spatial image with the PSF into HW*1 column vectors; and
   S33: performing normalization on the column vectors so that a Euclidean norm is 1;
   the sparse positive source separation optimized model solved in the step S3 is as follows:

$$\min_x \|y - Ax\|_1 + \lambda \|x\|_1 \text{ s.t. } x \geq 0$$

through solving the above model, HW*1 column vectors x corresponding to a clear image may be obtained, wherein the y is column vectors of HW*1 rearranged by the pixels of the blurry image, the x is the HW*1 column vectors corresponding to the clear image, the $\lambda$ is an equilibrium parameter, and the value of the $\lambda$ should be adjusted adaptively according to a noise level and an energy level of the y.

4. The image deblurring method based on the sparse positive source separation model according to claim 2, wherein if a to-be-processed image has a large resolution, the image is divided into a plurality of overlapped image blocks for processing; to divide the image blocks, two principles need to be met: 1) the overlapped length on a height direction is not smaller than $w_1$, and the overlapped length on a width direction is not smaller than $w_2$; and 2) the image blocks should be large enough in size so that the image content meets a sparse hypothesis of the sparse positive source separation optimized model.

* * * * *